US009431645B2

(12) United States Patent
Minagata et al.

(10) Patent No.: US 9,431,645 B2
(45) Date of Patent: Aug. 30, 2016

(54) ELECTRICITY STORAGE DEVICE AND ELECTRICITY STORAGE MODULE

(71) Applicant: KABUSHIKI KAISHA TOYOTA JIDOSHOKKI, Kariya-shi, Aichi-ken (JP)

(72) Inventors: Atsushi Minagata, Kariya (JP); Motoaki Okuda, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 14/429,039

(22) PCT Filed: Sep. 23, 2013

(86) PCT No.: PCT/JP2013/075598
§ 371 (c)(1),
(2) Date: Mar. 18, 2015

(87) PCT Pub. No.: WO2014/050770
PCT Pub. Date: Apr. 3, 2014

(65) Prior Publication Data
US 2015/0228959 A1 Aug. 13, 2015

(30) Foreign Application Priority Data

Sep. 28, 2012 (JP) ................. 2012-217730

(51) Int. Cl.
*H01M 2/30* (2006.01)
*H01M 2/06* (2006.01)
*H01M 2/20* (2006.01)
*H01M 2/02* (2006.01)

(52) U.S. Cl.
CPC .............. *H01M 2/307* (2013.01); *H01M 2/06* (2013.01); *H01M 2/202* (2013.01); *H01M 2/30* (2013.01); *H01M 2/0237* (2013.01); *H01M 2220/20* (2013.01)

(58) Field of Classification Search
None
See application file for complete search history.

(56) References Cited

U.S. PATENT DOCUMENTS

| 5,707,758 A | * | 1/1998 | Iwatsu ................. H01M 2/065 429/181 |
| 6,534,212 B1 | | 3/2003 | Hooke |
| 2005/0106455 A1 | | 5/2005 | Yoshida et al. |

FOREIGN PATENT DOCUMENTS

| CN | 102255062 A | | 11/2011 |
| JP | 9-92241 | * | 4/1997 |

(Continued)

OTHER PUBLICATIONS

Machine translation of CN 102255062, Nov. 2011.*

(Continued)

*Primary Examiner* — Jonathan Crepeau
(74) *Attorney, Agent, or Firm* — Sughrue Mion, PLLC

(57) ABSTRACT

An electricity storage device includes a case, an electrode assembly housed in the case, and a positive electrode (negative electrode) terminal sending and receiving electricity to and from the electrode assembly. The positive electrode (negative electrode) terminal includes a cylindrical part having a part projecting outside the case. The outer peripheral surface of the cylindrical part has a male screw with which a nut for fastening the positive electrode (negative electrode) terminal to the case is threadedly engaged from the outside of the case. The inner peripheral surface of the cylindrical part has a female screw having a screw direction opposite the male screw.

10 Claims, 5 Drawing Sheets

(56) References Cited

FOREIGN PATENT DOCUMENTS

| | | |
|---|---|---|
| JP | 2001-357833 A | 12/2001 |
| JP | 2003-197176 A | 7/2003 |
| JP | 2004-253295 A | 9/2004 |
| JP | 2005-116195 A | 4/2005 |
| JP | 2003-229116 A | 8/2006 |
| JP | 2006-252792 A | 9/2006 |
| JP | 2007-188787 A | 7/2007 |
| JP | 2010-97764 A | 4/2010 |
| JP | 2011-241911 A | 12/2011 |

OTHER PUBLICATIONS

Communication dated Aug. 24, 2015 from the State Intellectual Property Office of the People's Republic of China in counterpart Application No. 201380050075.4.
International Search Report for PCT/JP2013/075598 dated Oct. 29, 2013.
Written Opinion for PCT/JP2013/075598 dated Oct. 29, 2013.

* cited by examiner

US 9,431,645 B2

ELECTRICITY STORAGE DEVICE AND ELECTRICITY STORAGE MODULE

CROSS REFERENCE TO RELATED APPLICATIONS

This application is a National Stage of International Application No. PCT/JP2013/075598 filed Sep. 23, 2013, claiming priority based on Japanese Patent Application No. 2012-217730 filed Sep. 28, 2012, the contents of all of which are incorporated herein by reference in their entirety.

TECHNICAL FIELD

The present invention relates to an electricity storage device and an electricity storage module.

BACKGROUND ART

In the prior art, a lithium-ion rechargeable battery and a nickel-metal hydride rechargeable battery each are well known as an electricity storage device installed in a vehicle or the like. Such a rechargeable battery has an electrode assembly including a positive electrode, a negative electrode, and a separator, which are stacked in a layered form (e.g., refer to patent document 1). The separator insulates the positive electrode from the negative electrode.

Patent document 1 describes a rechargeable battery that includes an electrode terminal transmitting and receiving electricity to and from an electrode. The electrode terminal includes a disc portion accommodated in a case and a rod extending from the disc portion. The rod of the electrode terminal projects out of the case through a through hole formed in the case. A male thread is formed on an external side surface of the rod of the electrode terminal. The electrode terminal is fastened to the case by engaging a nut with the male thread of the electrode terminal.

PRIOR ART DOCUMENT

Patent Document

Patent Document 1: Japanese Laid-Open Patent Publication No. 2004-253295

SUMMARY OF THE INVENTION

When a rechargeable battery is used as a power supply to a vehicle driving motor, charging and discharging of a large current and a large capacitance are necessary. Thus, a plurality of rechargeable batteries may be electrically connected in series or parallel at electrode terminals by bus bars and used as an assembled battery.

In such a rechargeable battery, a bus bar may be fastened between a bolt and the electrode terminal, for example, by forming a female thread on a distal surface of the rod of the electrode terminal and engaging the bolt with the female thread.

However, in this case, when engaging the bolt with the female thread of the electrode terminal, a rotation torque that is transmitted from the bolt to the electrode terminal may cause the electrode terminal to rotate together with the bolt. Such rotation of the electrode terminal together with the bolt may loosen the nut fastened to the electrode terminal. This decreases a force fastening the electrode terminal to the case.

It is an object of the present invention to provide an electricity storage device and an electricity storage module that limit decreases in a force fastening an electrode terminal to a case.

To achieve the object, one aspect of an electricity storage device according to the present invention includes a case, an electrode assembly accommodated in the case, and an electrode terminal transmitting and receiving electricity to and from the electrode assembly. The electrode terminal includes a tube including a portion projecting out of the case. An outer circumferential surface of the tube includes a male thread, with which a nut is engaged from the outer side of the case to fasten the electrode terminal to the case. An inner circumferential surface of the tube includes a female thread that is threaded in a direction opposite to that of the male thread.

DETAILED DESCRIPTION OF THE PREFERRED EMBODIMENTS

One embodiment of the present invention will now be described with reference to FIGS. 1 to 6.

Figure 1:
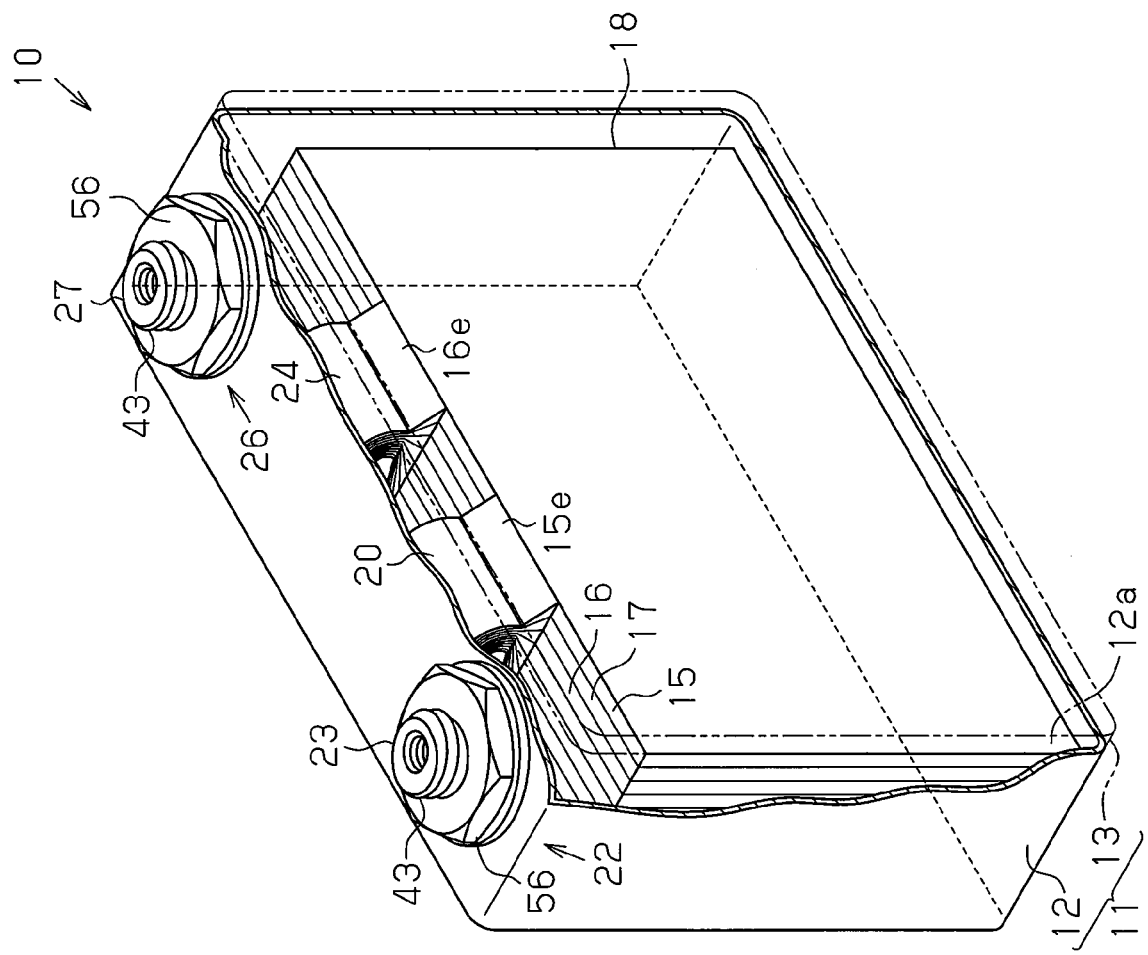
FIG. 1 is a partially cut-away perspective view of one embodiment of a rechargeable battery according to the present invention.

As shown in FIG. 1, a rechargeable battery 10, which serves as an electricity storage device, includes a case 11, which has a generally cuboid shape and has a low profile as a whole. The case 11 includes a main body member 12, which is low-profile tetragonal box-like, and a cover member 13, which is rectangular plate-like and covers an opening 12a of the main body member 12. The main body member 12 and the cover member 13 are each formed from metal (e.g., stainless steel or aluminum). The rechargeable battery 10 of the present embodiment includes a lithium-ion rechargeable battery.

The case 11 includes an electrode assembly 18 in which positive electrodes 15 and negative electrodes 16 are stacked having separators 17 in between to have a layered form. The electrode assembly 18 is covered by an insulative member (not shown) and accommodated in the case 11. The case 11 contains an electrolyte solution.

Figure 2:
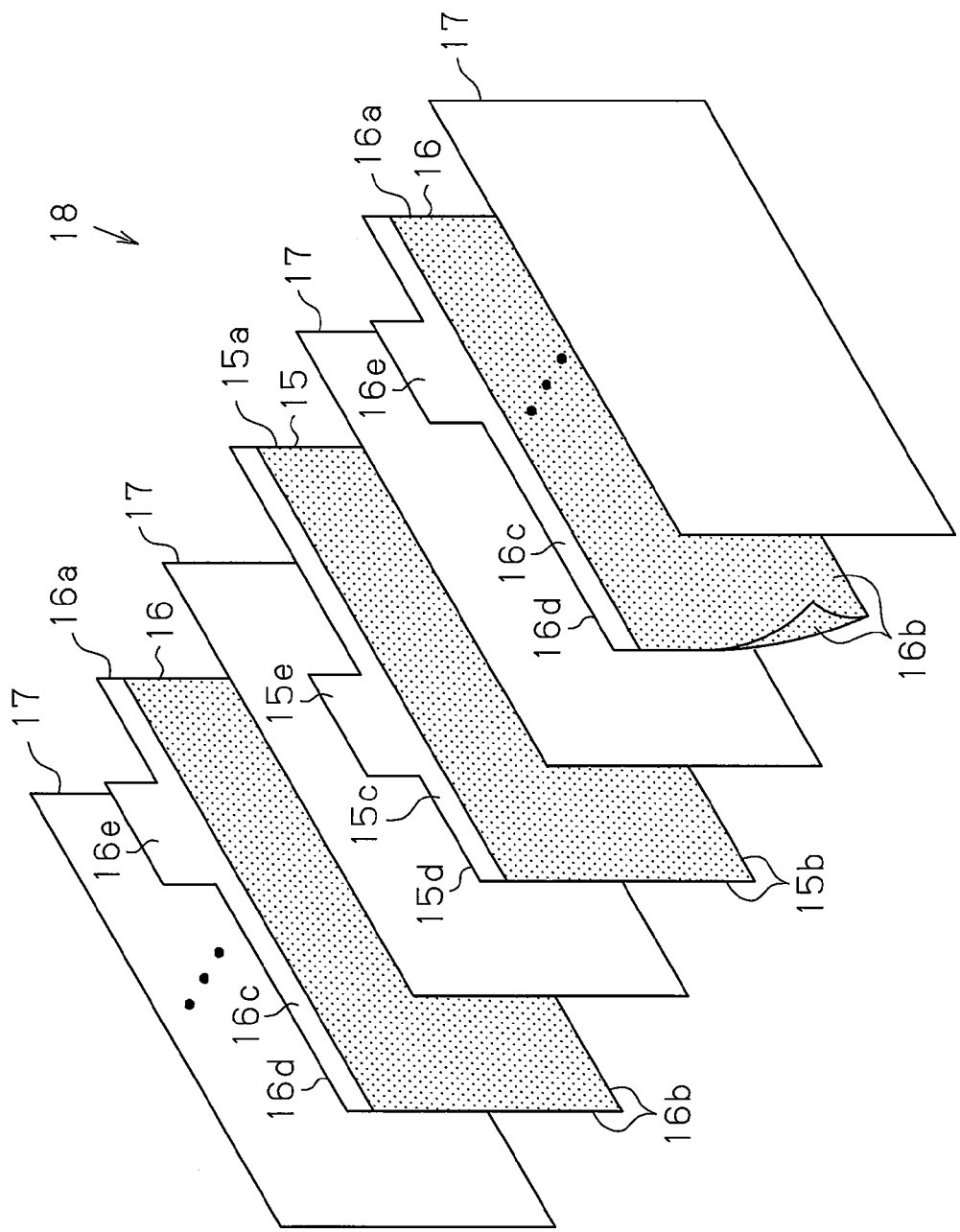
FIG. 2 is an exploded perspective view of an electrode assembly of FIG. 1.

As shown in FIG. 2, each of the positive electrodes 15 includes a rectangular sheet-like positive metal foil 15a and positive active material layers 15b formed by applying a positive active material to opposite surfaces of the positive metal foil 15a. The positive electrode 15 also includes a positive active material-free portion 15c, which is free from the positive active material. The positive active material-free portion 15c extends along one of long-side portions 15d of the positive metal foil 15a. The positive electrode 15 also includes a positive electrode tab 15e, which is part of the positive active material-free portion 15c. The positive electrode tab 15e projects from the long-side portion 15d of the positive metal foil 15a. In the same manner, each of the negative electrodes 16 includes a rectangular sheet-like negative metal foil 16a and negative active material layers 16b formed by applying a negative active material to opposite surfaces of the negative metal foil 16a. The negative electrode 16 also includes a negative active material-free portion 16c, which is free from the negative active material. The negative active material-free portion 16c extends along one of long-side portions 16d of the negative metal foil 16a. The negative electrode 16 also includes a negative electrode tab 16e, which is part of the negative active material-free portion 16c. The negative electrode tab 16e projects from the long-side portion 16d of the negative metal foil 16a.

The positive electrodes 15 are stacked in a certain direction in which the positive electrode tabs 15e overlap one another. The negative electrodes 16 are stacked in a certain direction in which the negative electrode tabs 16e overlap one another. In this case, the positive electrodes 15 and the negative electrodes 16 are stacked so that the positive electrode tabs 15e of the positive electrodes 15 do not overlap the negative electrode tabs 16e of the negative electrodes 16.

As shown in FIG. 1, a plurality of the positive electrode tabs 15e are gathered to one end of the electrode assembly 18 in the stacking direction and stacked in a layered form. This forms a positive electrode tab batch 20. The positive electrode tab batch 20 is electrically connected to a positive terminal 23, which serves as an electrode terminal, by a positive conductive member 21 (refer to FIG. 3). The positive terminal 23 forms a positive terminal portion 22. A plurality of the negative electrode tabs 16e are gathered to one end of the electrode assembly 18 in the stacking direction and stacked in a layered form. This forms a negative electrode tab batch 24. The negative electrode tab batch 24 is electrically connected to a negative terminal 27, which serves as an electrode terminal, by a negative conductive member (not shown). The negative terminal 27 forms a negative terminal portion 26. The positive terminal 23 and the negative terminal 27 transmit and receive electricity to and from the electrode assembly 18.

The structure of the positive terminal portion 22 will now be described. The negative terminal portion 26 has the same structure as the positive terminal portion 22.

Figure 3:
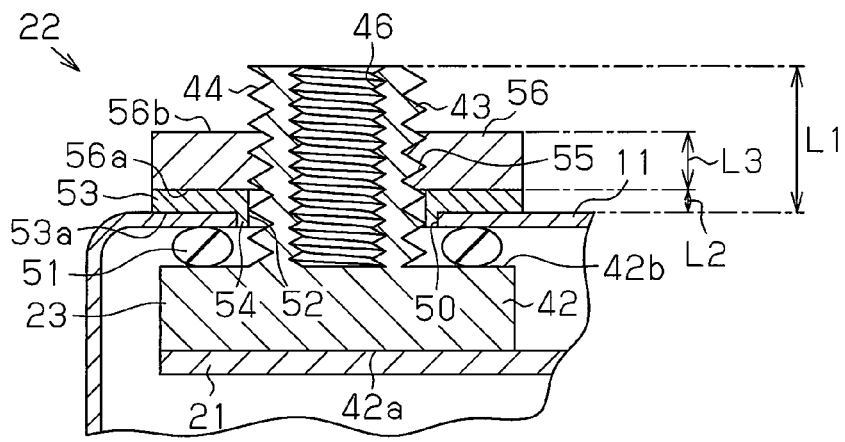
FIG. 3 is an enlarged cross-sectional view showing a portion of the rechargeable battery of FIG. 1.
Figure 4:
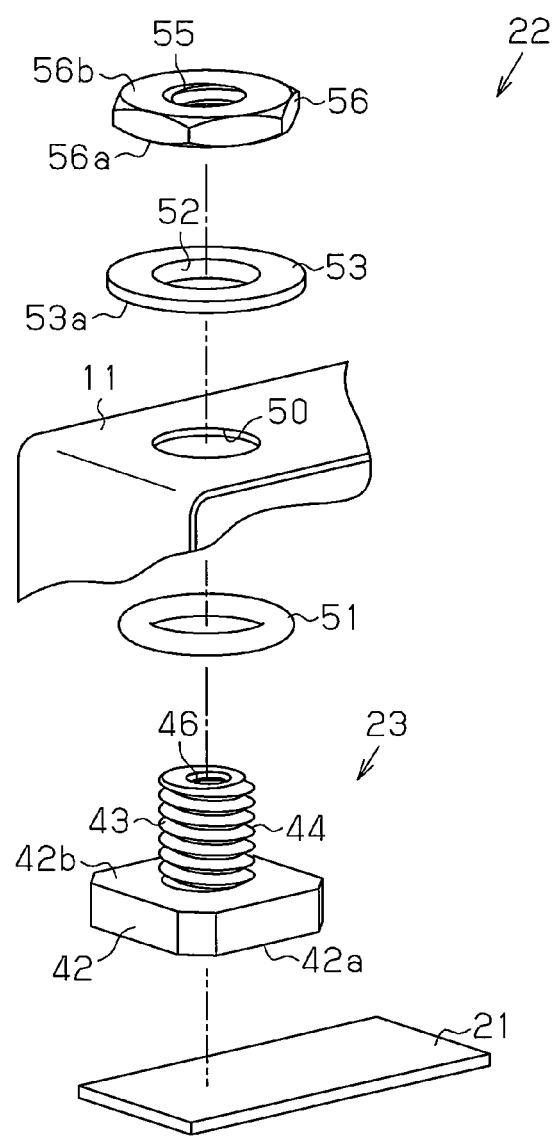
FIG. 4 is an exploded perspective view showing a positive terminal portion of FIG. 3.

As shown in FIGS. 3 and 4, the positive terminal 23 includes a base 42, which has a generally cuboid shape and is joined with the positive conductive member 21, and a cylindrical tube 43, which projects from an end surface 42b of the base 42 that is located at a side opposite to an end surface 42a joined with the positive conductive member 21.

A male thread 44, which is threaded in a left-hand direction, is entirely formed on an outer circumferential surface of the tube 43 in the projecting direction of the tube 43. A female thread 46, which is threaded in a right-hand direction, is entirely formed on an inner circumferential surface of the tube 43 in the projecting direction of the tube 43. More specifically, the male thread 44 and the female thread 46 are threaded in opposite directions.

A circular through hole 50 is formed in a location of the case 11 that corresponds to the positive terminal 23. The through hole 50 is in communication with the outside and the inside of the case 11. The diameter of the through hole 50 is set to be slightly larger than an outer diameter of the tube 43 of the positive terminal 23. The tube 43 of the positive terminal 23 extends through the through hole 50 from the inside toward the outside of the case 11. Thus, the tube 43 of the positive terminal 23 partially projects out of the case 11 through the through hole 50.

An O-ring 51, which is formed from an elastic material, is arranged between the base 42 of the positive terminal 23 and an inner surface of the case 11. The O-ring 51 is fitted to the tube 43 of the positive terminal 23 from the outer side. The O-ring 51 is in contact with the inner surface of the case 11 and surrounds the through hole 50 of the case 11, through which the tube 43 of the positive terminal 23 extends. Additionally, the O-ring 51, which is insulative and arranged between the base 42 of the positive terminal 23 and the case 11, insulates the positive terminal 23 from the case 11.

A washer 53, which is formed from an insulative material and has a through hole 52 extending through in the thicknesswise direction, is fitted from the outer side to the tube 43 of the positive terminal 23, which projects through the through hole 50 of the case 11. An end surface 53a of the washer 53 that is in contact with an outer surface of the case 11 includes an annular projection 54 formed along a hole edge of the through hole 52. The projection 54 of the washer 53 enters a gap between the tube 43 of the positive terminal 23 and the hole edge of the through hole 50 of the case 11. Thus, the projection 54 of the washer 53, which is arranged between the tube 43 of the positive terminal 23 and the case 11, insulates the positive terminal 23 from the case 11.

A metal hexagonal nut 56, which serves as a nut, includes a female thread 55 threaded in the left-hand direction. The hexagonal nut 56 is engaged with the male thread 44 on the tube 43 of the positive terminal 23. The hexagonal nut 56 is in contact with the outer surface of the case 11 with the washer 53 arranged in between in the projecting direction of the tube 43 of the positive terminal 23. The projecting amount L1 of the tube 43 of the positive terminal 23 from the through hole 50 of the case 11 is greater than the sum of the thickness L2 of the washer 53 and the thickness L3 of the hexagonal nut 56. Thus, a distal surface of the tube 43 of the positive terminal 23 projects from an end surface 56b of the hexagonal nut 56 that is located at a side opposite to an end surface 56a, which is in contact with the washer 53.

The procedures for coupling the positive terminal portion 22 to the case 11 will now be described. The procedures for coupling the negative terminal portion 26 to the case 11 are the same as the procedures for coupling the positive terminal portion 22 to the case 11.

As shown in FIG. 3, when the washer 53 is fitted from an outer side to the tube 43 of the positive terminal 23, which projects from the through hole 50 of the case 11, the hexagonal nut 56 is engaged with the male thread 44 formed on the outer circumferential surface of the tube 43 of the positive terminal 23.

As the hexagonal nut 56 is engaged with the tube 43 of the positive terminal 23, the hexagonal nut 56 comes into close contact with the washer 53, which is arranged between the hexagonal nut 56 and the outer surface of the case 11. Further engagement of the hexagonal nut 56 with the tube 43 of the positive terminal 23 urges the tube 43 of the positive terminal 23 in a direction toward the outside of the case 11. Consequently, the base 42 of the positive terminal 23 is pressed and brought in close contact with the inner surface of the case 11 with the O-ring 51 arranged in between. This fastens the positive terminal 23 to the case 11.

The O-ring 51, which is arranged between the base 42 of the positive terminal 23 and the inner surface of the case 11, is pressed by the base 42 of the positive terminal 23 and in close contact with the inner surface of the case 11. The O-ring 51 seals the through hole 50 of the case 11, through which the tube 43 of the positive terminal 23 extends. Thus, the inside of the case 11 is sealed in a liquid-tight manner.

The operation of the rechargeable battery 10, which is configured in the above manner, will now be described.

Figure 5:
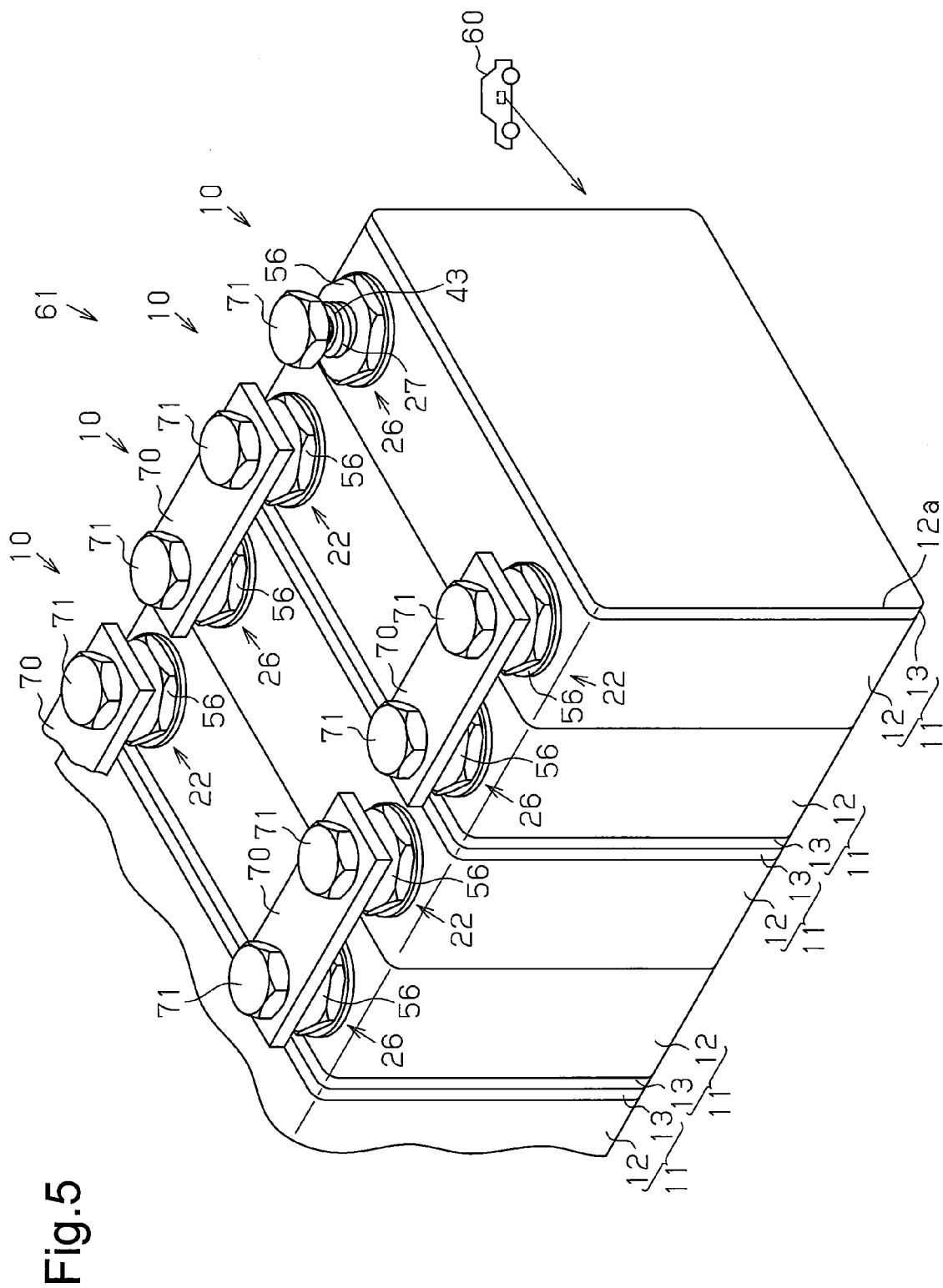
FIG. 5 is a perspective view showing an assembled battery including the rechargeable batteries shown in FIG. 1.

As shown in FIG. 5, a plurality of the rechargeable batteries 10 are connected to one another to form an assembled battery 61, which serves as an electricity storage module installed in a vehicle 60. When forming the assembled battery 61, the positive terminal 23, which forms the positive terminal portion 22 of each rechargeable battery 10, is connected to the negative terminal 27 of the adjacent rechargeable battery 10 by a bus bar 70, which serves as a terminal connection member. The negative terminal 27, which forms the negative terminal portion 26 of each rechargeable battery 10, is connected to the positive terminal 23 of the adjacent rechargeable battery 10 by a bus bar 70, which serves as the terminal connection member. In the rechargeable battery 10 of the present embodiment, when the two terminal portions 22, 26 are coupled to the case 11, fastening bolts 71 are engaged with the female threads 46 of the tubes 43 of the two terminals 23, 27 forming the two terminal portions 22, 26, respectively. This fastens the bus bars 70 to the tubes 43 of the two terminals 23, 27 in a steady manner.

Figure 6:
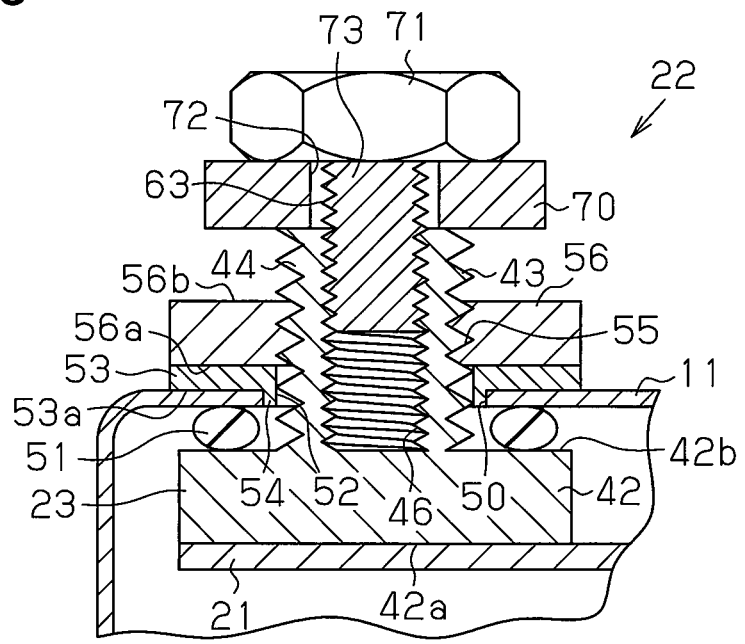
FIG. 6 is a partially enlarged cross-sectional view of the positive terminal portion to which a bus bar is fastened.

In this case, as shown in FIG. 6, in the rechargeable battery 10 of the present embodiment, when a through hole 72 extending through the bus bar 70 in the thicknesswise direction is aligned with the inner circumferential surface of the tube 43 of the positive terminal 23, an axial portion 73 of the bolt 71 extends through the through hole 72 of the bus bar 70. The bolt 71 rotates in the clockwise direction, which conforms to the thread direction of the male thread 63, as the axial portion 73 of the bolt 71 is inserted into the tube 43 of the positive terminal 23. This engages the male thread 63 of the bolt 71 with the female thread 46 formed on the inner circumferential surface of the tube 43.

In this situation, a rotation torque in the clockwise direction is applied to the positive terminal 23 from the male thread 63 of the bolt 71 through the female thread 46. The hexagonal nut 56 is firmly in close contact with the washer 53 arranged between the hexagonal nut 56 and the case 11 in accordance with a friction force in a circumferential direction the center of which is the tube 43. This restricts rotation of the hexagonal nut 56 together with the positive terminal 23 in the circumferential direction, the center of which is the tube 43, even when the rotation torque from the bolt 71 acts to rotate the positive terminal 23. As a result, the hexagonal nut 56 rotates relative to the positive terminal 23 in the counterclockwise direction, which is opposite to a direction in which the positive terminal 23 rotates, which is the clockwise direction.

The female thread 55 of the hexagonal nut 56 is threaded in the left-hand direction. Thus, the hexagonal nut 56 rotates relative to the positive terminal 23 in a direction in which a fastening torque to the tube 43 of the positive terminal 23 increases. This limits loosening of the hexagonal nut 56 from the positive terminal 23.

The hexagonal nut 56 also functions as a rotation stopper that restricts rotation of the positive terminal 23 together with the bolt 71 in the clockwise direction. The bolt 71 is engaged with the positive terminal 23, the rotation of which is restricted by the hexagonal nut 56. Thus, the bus bar 70 is firmly fastened to the tube 43 of the positive terminal 23 by the bolt 71.

The engaged hexagonal nut 56 further strongly urges the tube 43 of the positive terminal 23 in the direction toward the outside of the case 11. The O-ring 51 arranged between the base 42 of the positive terminal 23 and the inner surface of the case 11 is further firmly pressed by the base 42 of the positive terminal 23, and in close contact with the inner surface of the case 11 accordingly.

The above embodiment has the advantages described below.

(1) The male thread 44 and the female thread 46, which are formed on the tubes 43 of the two terminals 23, 27, are threaded in opposite directions. Thus, when the bolts 71 are engaged with the female threads 46 of the tubes 43 of the two terminals 23, 27 from the outside of the case 11, the two terminals 23, 27 act to rotate together with the bolts 71, while the hexagonal nuts act to rotate relative to the two terminals 23, 27 in a direction opposite to the rotation direction of the two terminals 23, 27, respectively. Consequently, the rotation torque in the fastening direction is applied from the hexagonal nuts 56 to the male threads 44 of the two terminals 23, 27. This limits loosening of the hexagonal nuts 56 from the tubes 43 of the two terminals 23, 27, thereby limiting decreases in the force fastening the two terminals 23, 27 to the case 11. Additionally, in this case, the hexagonal nuts 56 firmly fasten the O-rings 51 between the bases 42 of the two terminals 23, 27 and the case 11. Thus, the inside of the case 11 may be sealed in a highly reliable manner.

(2) The two terminals 23, 27 are joined with the conductive member 21 that electrically connects the two terminals 23, 27 and the electrode assembly 18. Thus, the conductive member 21 restricts rotation of the two terminals 23, 27. This limits loosening of the hexagonal nuts 56 from the two terminals 23, 27 caused by rotation of the two terminals 23, 27, thereby further limiting decreases in the force fastening the two terminals 23, 27 to the case 11.

(3) In each of the two terminals 23, 27, the female thread 46 in the tube 43 is threaded in the right-hand direction. Thus, the bolt 71, which is right-hand threaded and thus highly versatile, may be used as the bolt 71 engaged with the female thread 46.

(4) The hexagonal nuts 56 restrict rotation of the two terminals 23, 27. The bolts 71 are engaged with the female threads 46 of the tubes 43 of the two terminals 23, 27. This firmly fastens the bus bars 70 between the bolts 71 and the tubes 43 of the two terminals 23, 27.

(5) In the two terminals 23, 27, the distal surfaces of the tubes 43 project from the case 11 beyond the end surfaces 56b of the hexagonal nuts 56 in a direction in which the tubes 43 extend through the through holes 50 of the case 11. Thus, when the bolts 71 are engaged with the female threads 46 of the tubes 43 of the two terminals 23, 27, the bus bars 70 may be in close contact with the distal surfaces of the tube 43 of the two terminals 23, 27. This reduces electrical resistance of boundary areas where the bus bars 70 are in contact with the tubes 43 of the two terminals 23, 27.

(6) The hexagonal nuts 56 restrict rotation of the two terminals 23, 27. The bolts 71 fasten the bus bars 70 to the tubes 43 of the two terminals 23, 27. In each of the two terminals 23, 27, an oxide layer, which has a low conductivity, may be formed on the distal surface of the tube 43. The distal surface is in contact with the bus bar 70. Thus, such an oxide layer is scraped and removed by the bus bar 70. This further reduces electrical resistance of the boundary areas, where the bus bars 70 are in contact with the tubes 43 of the two terminals 23, 27.

The embodiment may be modified as follows.

Figure 7:
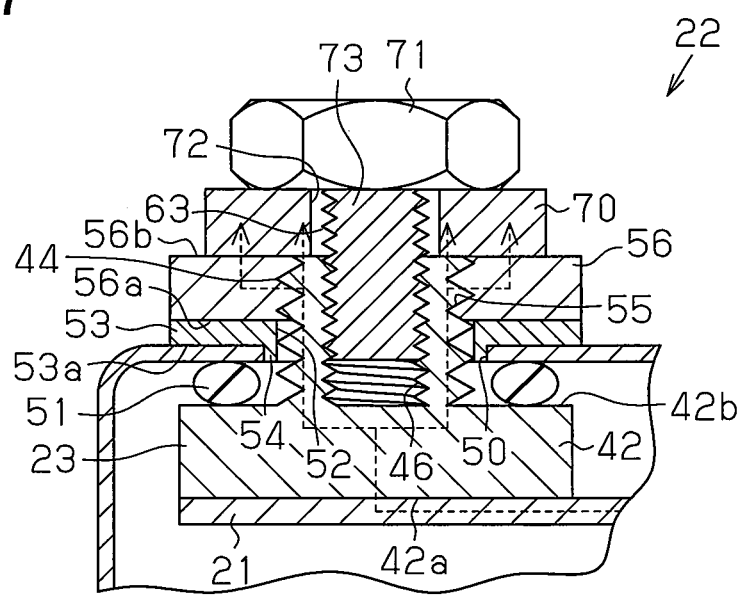
FIG. 7 is a partially enlarged cross-sectional view of a modified example of a positive terminal portion to which a bus bar is fastened.

As shown in FIG. 7, in the embodiment, the distal surfaces of the tubes 43 of the two terminals 23, 27 may be located at the same height as the end surfaces 56b of the hexagonal nuts 56.

In this structure, when the bolts 71 are engaged with the female threads 46 of the tubes 43 of the two terminals 23, 27, the bus bars 70 are in close contact not only with the distal surfaces of the tubes 43 of the two terminals 23, 27 but also with the end surfaces 56b of the hexagonal nuts 56. Thus, as indicated by arrows and broken lines in FIG. 7, the two terminals 23, 27 each transmit electricity to the bus bar 70 not only via the boundary area, where the bus bar 70 is in contact with the tube 43, but also via the hexagonal nut 56. This reduces electrical resistance between the two terminals 23, 27 and the bus bar 70.

In the embodiment, the tube 43 of each of the two terminals 23, 27 may have a structure in which the male thread 44 is threaded in the right-hand direction, and the female thread 46 is threaded in the left-hand direction.

In the embodiment, the male threads 44 may be omitted from basal portions of the tubes 43 of the two terminals 23, 27 that are accommodated in the case 11. In this case, the male thread 44 may be formed only at distal portions of the tubes 43 of the two terminals 23, 27 that project from the through holes 50 of the case 11.

In the embodiment, the tube 43 of each of the two terminals 23, 27 is not necessarily hollow throughout in the projecting direction. For example, the tube 43 of each of the two terminals 23, 27 may have a closed end and be hollow upward from an intermediate location in the projecting direction.

In the embodiment, nuts engaged with the male threads 44 on the tubes 43 of the two terminals 23, 27 are not limited to the hexagonal nuts 56 and thus may have any shape.

In the embodiment, members engaged with the female threads 46 in the tubes 43 of the two terminals 23, 27 are not limited to the bolts 71, which fasten the bus bars 70 to the tubes 43 of the two terminals 23, 27. For example, external terminals may be engaged with the female threads 46 in the tubes 43 of the two terminals 23, 27.

In the embodiment, the present invention is applied to the rechargeable battery 10 of a stacked type. However, the present invention may be embodied in a wound-type rechargeable battery in which a positive electrode strip and a negative electrode strip are wound and stacked in a layered form.

The vehicle 60, in which the assembled battery 61 of the embodiment is installed, includes an automobile and an industrial vehicle.

In the embodiment, the rechargeable battery 10 is a lithium-ion rechargeable battery, although not limited to a lithium-ion rechargeable battery. A different rechargeable battery, such as a nickel-metal hydride rechargeable battery, may be used.

An electricity storage device is not limited to the rechargeable battery 10. For example, an electricity storage device may be a capacitor, such as an electric double-layer capacitor or a lithium-ion capacitor.

The invention claimed is:

1. An electricity storage device comprising:
a case;
an electrode assembly accommodated in the case; and
an electrode terminal transmitting and receiving electricity to and from the electrode assembly, wherein the electrode terminal includes a tube including a portion projecting out of the case, wherein
an outer circumferential surface of the tube includes a male thread, and a nut is engaged with the male thread at the outer side of the case to fasten the electrode terminal to the case, wherein the nut is located outside the case of the assembled electricity storage device, and
an inner circumferential surface of the tube includes a female thread that is threaded in a direction opposite to that of the male thread,
wherein the male thread and the female thread at least partially overlap.

2. The electricity storage device according to claim 1, wherein the electrode terminal is joined with a conductive member that electrically connects the electrode terminal and the electrode assembly.

3. The electricity storage device according to claim 1, wherein
the male thread is threaded in a left-hand direction, and the female thread is threaded in a right-hand direction.

4. The electricity storage device according to claim 1, wherein the electricity storage device is a rechargeable battery.

5. An electricity storage module formed by connecting a plurality of the electricity storage devices according to claim 1, the electricity storage module further comprising:
a bolt engaged with the female thread of the tube; and
a terminal connection member fastened between the bolt and a distal surface of the tube that projects from the case, wherein the terminal connection member is electrically connected to the electrode terminals arranged on each of the electricity storage devices.

6. The electricity storage module according to claim 5, wherein the distal surface of the tube projects in a projection direction of the tube from the case beyond an end surface of the nut located at a side opposite to an end surface that is in contact with the case.

7. The electricity storage device according to claim 1, wherein both the male thread and the female thread extend throughout the entire length of the tube.

8. The electricity storage device according to claim 1, wherein rotation torque is applied from the nut to the male thread of the tube in the fastening direction.

9. The electricity storage device according to claim 1, further comprising a bolt engaged with the female thread of the tube, wherein
the bolt is engaged with the female thread of the tube by rotating the bolt from an outside of the case.

10. The electricity storage device according to claim 1, wherein the male thread and the female thread entirely overlap.

* * * * *